United States Patent [19]

Kusunoki et al.

[11] 4,005,370

[45] Jan. 25, 1977

[54] POWER SUPPLY MEANS FOR MAGNETRON

[75] Inventors: Shigeru Kusunoki, Yamato-Koriyama; Teruhisa Takano, Osaka; Hirofumi Yoshimura, Nara; Noboru Kurata, Yamato-Koriyama, all of Japan

[73] Assignee: Matsushita Electric Industrial Co., Ltd., Osaka, Japan

[22] Filed: Sept. 2, 1975

[21] Appl. No.: 609,727

[30] Foreign Application Priority Data

| Sept. 10, 1974 | Japan | 49-104495 |
| Sept. 10, 1974 | Japan | 49-104496 |
| Dec. 3, 1974 | Japan | 49-139316 |
| Dec. 3, 1974 | Japan | 49-139317 |

[52] U.S. Cl. .............................. 328/267; 328/270; 328/253
[51] Int. Cl.² ............................................ H03K 1/12
[58] Field of Search .......... 328/258, 261, 267, 270, 328/253

[56] References Cited

UNITED STATES PATENTS

| 2,788,445 | 4/1957 | Murray et al. | 328/258 |
| 3,207,994 | 9/1965 | Theodore et al. | 328/258 X |
| 3,300,656 | 1/1967 | Meier et al. | 328/261 X |
| 3,320,477 | 5/1967 | Boeker | 328/261 X |
| 3,546,606 | 12/1970 | Anderson | 328/267 |
| 3,902,099 | 8/1975 | Feinberg | 328/267 X |

Primary Examiner—John S. Heyman
Attorney, Agent, or Firm—Wenderoth, Lind & Ponack

[57] ABSTRACT

There is disclosed a magnetron power supply means which avoids use of bulky components and which has a frequency converter for drive of a magnetron at a frequency higher than that of a commercial power source. Feedback is supplied to the converter which in response maintains output within a specific range, which may be adjustable, whereby the power supply to the magnetron, and hence the output thereof are regulated.

9 Claims, 8 Drawing Figures

POWER SUPPLY MEANS FOR MAGNETRON

The present invention relates to a power supply means. More particularly the invention relates to a means able to provide regulated power supply to a magnetron such as employed in a microwave heating device.

In a magnetron there is a non-linear relationship between voltage and current and during production of high frequency power the dynamic impedance is extremely low. A voltage-current characteristic curve of a magnetron is shown in FIG. 1, and may be seen to include a portion A, in which increased voltage results in only a slight increase of current, and a portion B, in which, after a certain voltage level is reached, only a slight further increase of voltage results in considerable increase of current, portion B being the region in which the magnetron emits microwaves. Impedance of an element with non-linear characteristics being $dV/dI$, it is evident from FIG. 1 that the impedance of the magnetron functioning in portion B of the curve is very low. In other words, to control magnetron output a very closely regulated power supply is necessary. To avoid excessive fluctuation in magnetron output, most magnetron power supply means currently in use are designed to effect voltage regulation by means of a saturated core resonant circuit structure comprising an inductance portion constituted by a leakage transformer for voltage step-up, and a capacitance portion connected to the secondary side of the transformer.

In a conventional power supply circuit for a magnetron, such as, for example, shown in FIG. 2, power from a commercial source, for example, is supplied to the circuit via a main circuit switch 1. Upon closure of switch 1, heating power is supplied to a magnetron 8 via a transformer 5. Power may also be supplied to a leakage transformer 3 having an adjustable tap on the secondary side thereof, output from the transformer 3 being supplied to the magnetron 8 via a voltage multiplier circuit constituted by a capacitor 6 and diode 7. Power is not connected to the transformer 3 until closure of a normally open electromagnetic switch 2. The switch 2 is closed upon closure of a switch 4, which is externally actuable by a person wishing to utilize the oven, and which closes the power circuit to a relay coil of the electromagnetic switch 2. However, with such a transformer close control of output is difficult, particularly for high frequency applications, and there is also the disadvantage that the transformer is large and heavy.

In general, if an AC voltage having a value $e(t)$ at time $t$ is supplied to an inductance having N turns, a magnetic flux $\Phi$ is produced, it being possible to describe the relation between these factors by the following equation:

$$e(t) = -N \frac{d\Phi}{dt}$$

Taking the relation between instantaneous magnetic flux $\Phi(t)$ and maximum magnetic flux $\Phi m m$ to be representable by the equation $\Phi(t) = \Phi m \cos wt$, where $w$ is angular frequency and equals $2\pi f$, then $N \, d\Phi/dt = -Nw\Phi m \sin wt$. Also if instantaneous applied voltage $e(t)$ is taken to be equal to $Em \sin wt$, where $Em$ is the maximum applied voltage, then $Em = Nw\Phi m$. Thus for a given $Em$, the magnetic flux falls with increased frequency. Since total flux $\Phi$, flux density B, and the area of the surface S through which flux lines pass are related by the equation $\Phi = BS$, it is clear that the effective area of an iron core in a transformer is smaller at high frequencies, and that in order to maintain a requisite output the transformer must be large. In a conventional microwave oven, for example, the weight of a capacitor unit and the weight of a transformer for transfer of high-frequency power from a non-regulated source total several kilogrammes, and represent 20 – 30% of the weight of the entire oven equipment. In addition to this, the transformer being large, protection provided to prevent breakage of the transformer in a dropping test, for example, must be bulky, whereby provision of compact oven equipment is made difficult, and extra material is required for construction thereof.

Moreover, when a conventional iron-core resonant circuit construction is employed as a power supply, it is difficult to adjust the magnetron output to a required value. To effect requisite control it has been known to provide a thyristor or similar means which regulates the time during which power is supplied to the primary side of the transformer, or to change the value of the capacitor or provide a changeable tap on the secondary side of the transformer. However, such means as well as often resulting in surge current being supplied to the transformer, are difficult to adjust precisely and are generally expensive to install.

It is accordingly a principal object of the present invention to provide a magnetron power supply which supplies regulated power and is compact.

It is another object of the invention to provide a magnetron power supply means which is light.

It is a further object of the invention to provide a magnetron power supply means which prevents fluctuation of the drive operation point of the magnetron due to factors such as voltage variation in a power source.

It is a still further object of the invention to provide a magnetron power supply means permitting simple on-off switching of high-frequency oscillations and control of output.

In accomplishing these and other objects there is provided, according to the present invention, a magnetron power supply means wherein high frequency from an inverter circuit, which is connected to a DC or rectified AC external power source, is supplied through a resonant circuit to the primary side of a step-up transformer, and from the secondary side of the transformer to the magnetron. The duty cycle of the inverter is determined by a thyristor switching circuit which normally supplies input pulses to the thyristor gate, whereby power is supplied to the transformer, but stops when the anode voltage or current of the magnetron reaches a certain value and does not resume action until the magnetron output returns to a requisite level. This requisite level may be set externally, effected for example by providing a bridge circuit in which one element receives input from the anode side of the magnetron and another element is a resistance which may be externally set, gate input to the thyristor being stopped when there is lack of balance, i.e., when the input from the magnetron is not at a certain value requisite for balance as determined by the externally set element. Thus control of the outout of the magnetron can be achieved in a very simple manner, and with a very compact and light weight circuit. According to the invention, the thyristor gate circuit may receive control input from the incoming power lines, whereby the magnetron is protected from any source power variations.

A better understanding of the present invention may be had from the following full description of several preferred embodiments thereof, when read in reference to the attached drawings, in which.

Figure 1:
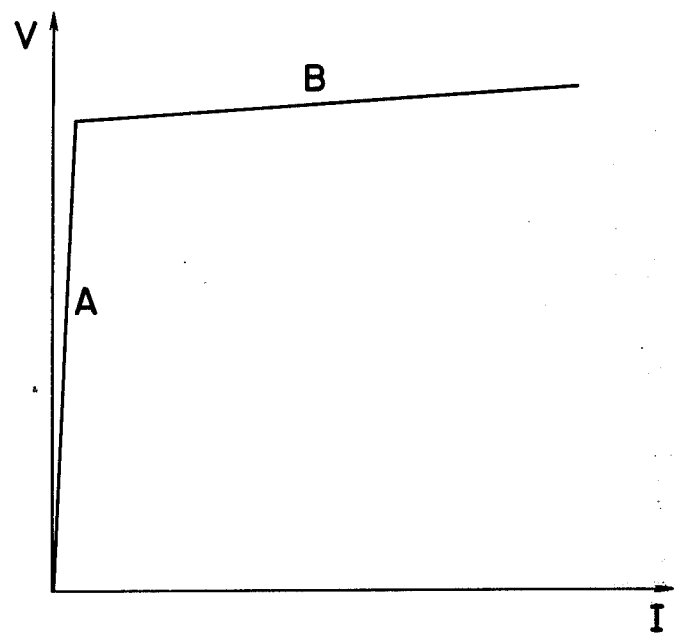
FIG. 1 is a characteristic curve showing voltage-current relation in a magnetron.
Figure 2:
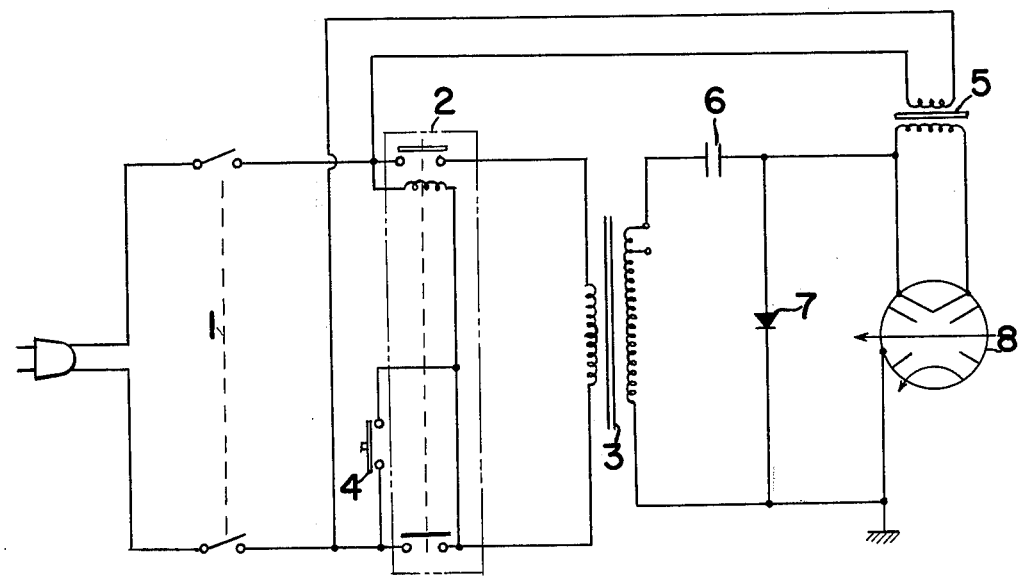
FIG. 2 is a circuit diagram of a conventional magnetron power supply means referred to in the foregoing description.
Figure 3:
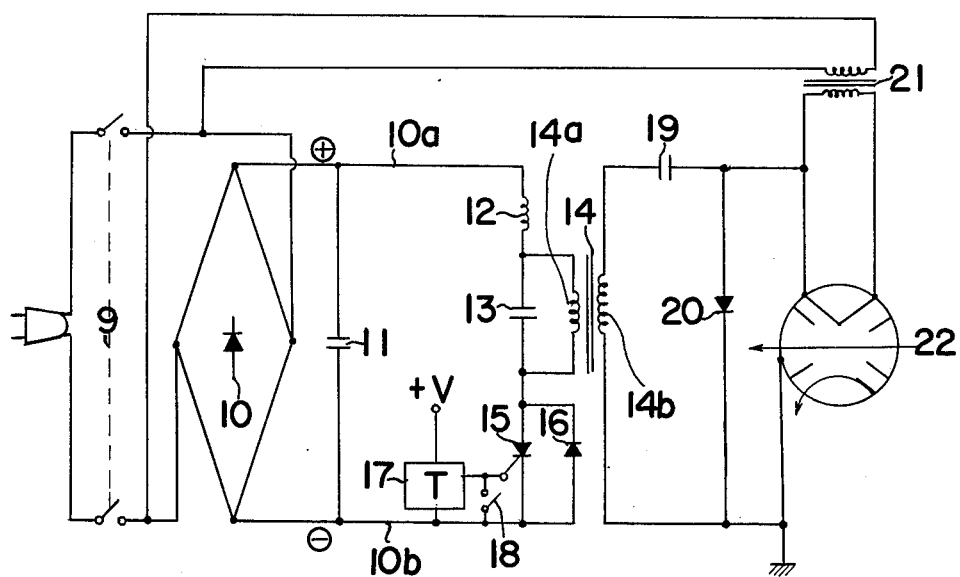
FIG. 3 is a circuit diagram of part of a magnetron power supply means according to the invention.

Referring to FIG. 3, in a magnetron power supply means according to the invention, upon closure of a switch 9, AC power from a suitable external, commercial source is supplied direct to a heater transformer 21 of a magnetron 22, and to diode bridge circuit 10 for full-wave rectification thereof, and thence to lines 10a and 10b, line 10a being positive with respect line 10b. Across lines 10a and 10b there is provided a reset capacitor 11 which is in parallel with a circuit comprising a thyristor 15 which is counter-parallel to a diode 16 and in series with a series circuit having a capacitor 13 and inductance coil 14a in parallel, and an inductance coil 12. The gate of the thyristor 15 connects to a trigger switch 18 which connects to a circuit 17 which includes an inverter for inversion of the DC power, and is also connected across the lines 10a and 10b and closes or opens the thyristor gate switch 18 in response to control input, in a manner described more fully below, and so determines the duty cycle of the inverter. Coil 14a is the primary side of an iron core step-up transformer the secondary side of 14b of which supplies power to the magnetron 22 via a voltage multiplier composed of a capacitor 19 and diode 20.

In this circuit, the portion between the diode bridge 10 and the primary side 14a of the transformer 14 constitutes a frequency converter. Power supplied from the commercial source is rectified by the bridge 10 and then fed to the transformer primary 14a in the form of high-frequency power supplied via the parallel L-C resonant circuit constituted by coil 12, capacitor 13 and coil 14a itself, in accordance with switching of the thyristor 15.

Needless to say, the inverter may have any one of many known configurations, and other modifications which do not depart from the principle of the invention, for example, a bridge rectifier circuit on the secondary side of the transformer 14, will be apparent to those skilled in the art.

Figure 4:
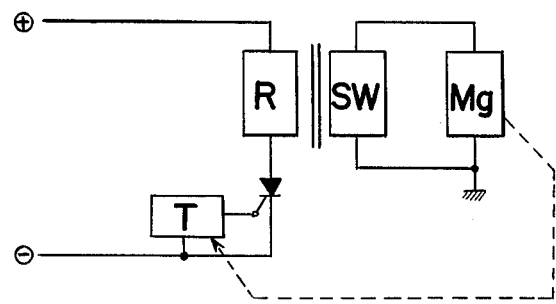
FIG. 4 is a block diagram illustrating the principles of a magnetron power supply means according to one embodiment of the invention.

Control of switching of the thyristor 15 may be effected by the circuit shown in block diagram form in FIG. 4, to which reference is now had. In FIG. 4, power is supplied to the magnetron represented at Mg from the secondary winding SW of a transformer fed by the L-C resonant circuit R, supply of power being controlled by a trigger and thyristor switching circuit T, which receives input from the anode side of the magnetron Mg. Current from the anode side of the magnetron Mg provides a feedback voltage to the trigger circuit T, which compares the feedback voltage with a reference voltage, and stops input to the thyristor gate when there is lack of coincidence between the feedback and reference values, whereby the periods in which power is supplied to the resonant circuit R depend on output from the magnetron Mg which therefore receives an accurately regulated input.

Figure 5:
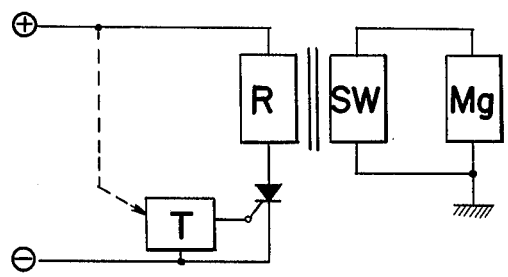
FIG. 5 is a block diagram illustrating the principles of a magnetron power supply means according to another embodiment of the invention.

Referring to FIG. 5, there is shown a block diagram of a circuit which is basically the same as that of FIG. 4, except that input to be compared with a reference voltage in the trigger circuit T is supplied from the lines carrying power from the initial source, whereby the magnetron Mg is protected from fluctuations in the initial power source.

Figure 6:
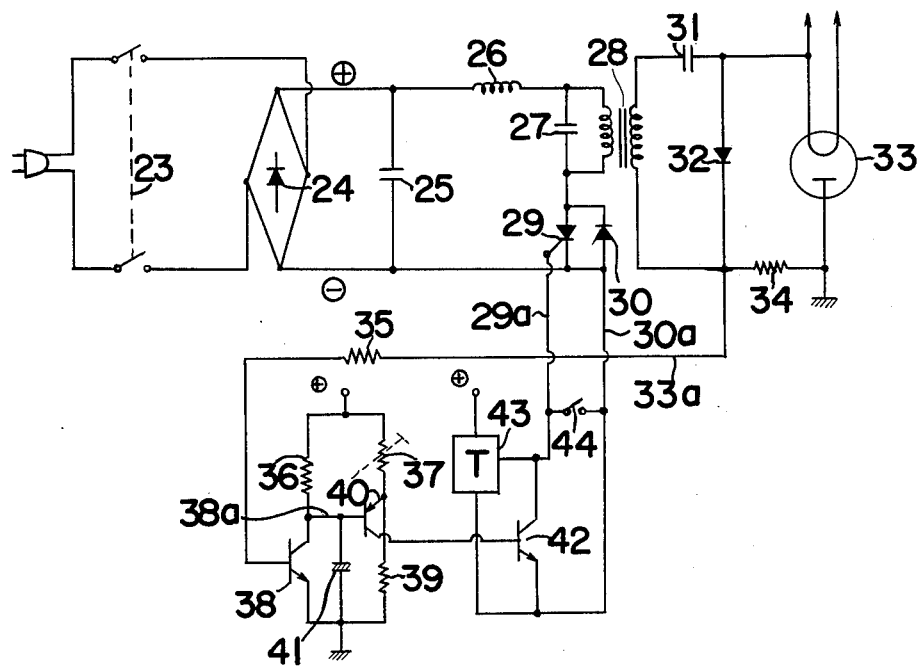
FIGS. 6 and 7 are circuit diagrams of various magnetron power supply means constructed in accordance with the principles of the circuit shown in FIG. 4.
Figure 7:
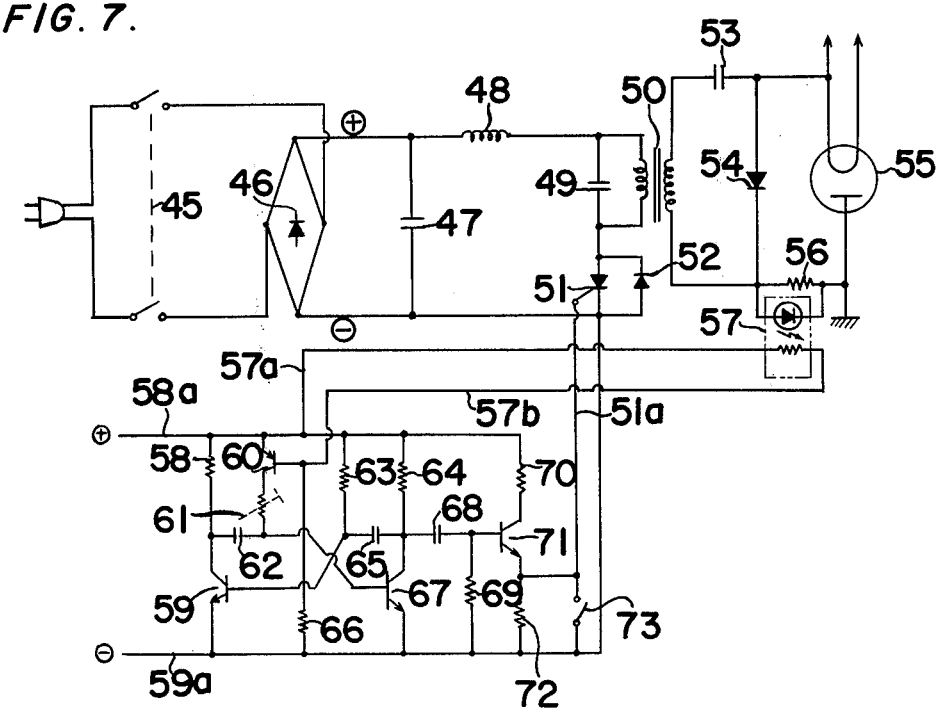
Figure 8:
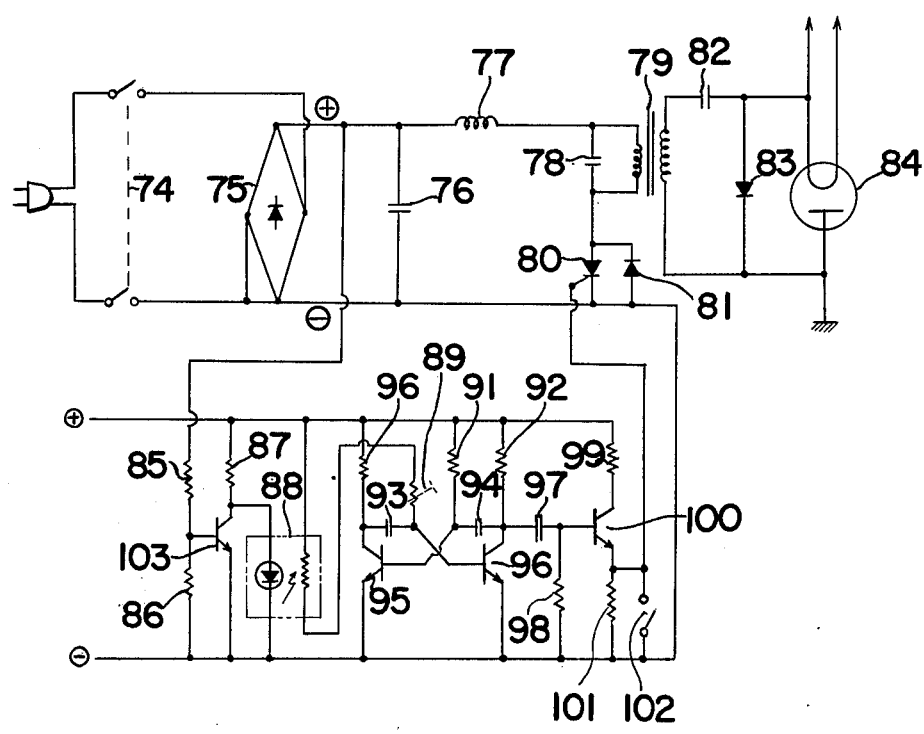
FIG. 8 is a circuit diagram of a magnetron power supply means according to the principles of the circuit shown in FIG. 5.

Specific embodiments incorporating the principles of the circuit of FIG. 4 are shown in FIGS. 6 and 7, and an embodiment incorporating the principles of the circuit of FIG. 5 is shown in FIG. 8.

Referring now to FIG. 6, the magnetron power supply means includes a circuit portion constituted by elements 23 through 30 corresponding to elements 9 through 16 of FIG. 3, elements 31 and 32 corresponding to elements 19 and 20 of FIG. 3 and a magnetron 33 corresponding to the magnetron 19 of FIG. 3. This portion of the circuit of this and subsequently described embodiments has the same configuration and functions in the same manner as the corresponding portion, for convenience referred to below as the upper portion, of the circuit of FIG. 3, and a detailed description thereof is therefore omitted.

A control signal to the thyristor switching terminal is obtained by a resistor 34 provided in a line 33a connected to the anode side of the magnetron 33, and is led along the line 33a through a current-limiting resistor 35 to the base of an NPN transistor 38. Transistor 38 forms a balanced bridge circuit together with resistors 36 and 39 and a variable resistor 37, the setting of which can be adjusted manually by suitable means, not indicated, external to the circuit, the resistor 36, resistor 37, transistor 38 and resistor 39 being disposed as branches I, II, III and IV, respectively of the bridge circuit. A line 38a which corresponds to the detector arm of the circuit connects the junction of resistor 39 and the collector of transistor 38 of a PNP transistor the emitter of which is connected to the junction of resistors 37 and 39. The line 38a is also connected to ground via a smoothing capacitor 41. The collector of transistor 40 connects to the base of an NPN transistor 42, which serves to control gate input to the thysistor 29, has a collector connecting to a line 29a which leads from the trigger circuit 43 to the gate of thyristor 29 and an emitter connecting to a line 30a which leads from the trigger circuit to the anode of diode 30. A gate switch 44 is provided across lines 29a and 30a.

In this circuit, presuming the bridge circuit constituted by resistors 36, 37 and 39 and transistor 38 is balanced, gate signals are supplied to thyristor 29 and high-frequency power to drive magnetron 33 is supplied via transformer 28. If, however, the output from the anode side of magnetron 33 rises and voltage between the collector and emitter falls to below a certain value determined by the relative values of resistors 37 and 39, the bridge circuit becomes unbalanced, and transistor 40 becomes conductive, whereupon transistor 42 also conducts, and a gate signal can no longer be supplied to thyristor 28. The level of magnetron output at which this action takes place may be varied by altering the setting of the variable resistor 37. In other words the heating power produced by the magnetron 33 may be controlled simply. When the level of output from the magnetron 33 again reaches the requisite level, supply of input thereto is of course continued. Thus excessive rise of magnetron output above a set reference level is prevented by a compact circuit, and setting of the required reference level is effected in a very simple manner.

Referring to FIG. 7, there is shown a circuit wherein a current signal from the anode side of a magnetron is supplied through a photo-coupler as a feedback signal for control of trigger circuit frequency. In the circuit elements identified as 45 through 55 define a circuit portion corresponding to the upper portion 23 through 33 of the circuit of FIG. 3. A magnetron anode current signal is taken out via a resistor 56 which is in parallel with a photo-coupler 57 having one terminal connecting to a line 57a and the other to a line 57b, these lines leading to a trigger circuit which is provided across a positive line 58a and a negative line 59a. The positive line 58a is connected directly to line 57a and the negative line 59a leads to the cathode of thyristor 51 and anode of diode 52. Across the positive line 58a and negative line 59a there is provided a resistor 58 and an NPN transistor 59 in series, the emitter of transistor 59 being connected to line 59a. The junction of resistor 58 and transistor 59 is connected through a capacitor 62 to the base of an NPN transistor 67 which is connected in series with a resistor 64 across lines 58a and 59a, the emitter of transistor 67 being connected to the negative line 59a, and to the lower end of an externally adjustable variable resistor 61 the upper end of which is connected to the collector of an NPN transistor 60. The emitter of transistor 60 is connected to the trigger circuit positive line 58a, and the base thereof is connected by line 57b to photo-coupler 57 and through a resistor 66 to the negative line 59a. The base of transistor 59 is connected through a resistor 63 to the positive line 58a and through a capacitor 65 to the junction of resistor 64 and transistor 67. The other side of this junction is connected through a capacitor 68 to the base of an NPN transistor 71, having a collector connected through a resistor 70 to the positive line 58a and an emitter which is connected through a resistor 72 to the negative line 59a and also to a line 51a leading to the gate of thyristor 51 and connecting to the negative line 59a through a normally open gate switch 73, which is parallel to resistor 72. The junction of capacitor 68 and the base of transistor 71 is connected through a resistor 69 to the negative line 59a.

In this circuit, resistors 58, 61, 63 and 64, capacitor 62, and transistors 59 and 67 constitute an astable multivibrator, capacitor 68 and resistor 69 a differentiating circuit, and resistors 70 and 72 and transistor 71 a driver circuit. Increase in magnetron anode current results in reduced impedance of photo-coupler 57 and hence increased impedance of transistor 60, with consequent lowering of oscillation frequency, whereby anode current of the magnetron is returned to a reference level which is determined by the setting of variable resistor 61.

Referring to FIG. 8, in which elements identified as 74 through 84 correspond to the upper portion 23 through 33 of FIG. 6, the circuit shown is designed to provide stable input to magnetron 84 by detecting any variation in power supplied from an external source and varying the frequency of magnetron input accordingly. Variation in voltage from the external source is detected by a voltage divider constituted by resistors 85 and 86, and is supplied to an amplification and conversion circuit constituted by a resistor 87, photo-coupler 88 and transistor 103, the photo-coupler 88 constituting a resistance in an astable multivibrator, which is constituted by a variable resistor 89 in series with the photo-coupler 88, resistors 90, 91 and 92, capacitors 93 and 94, and transistors 95 and 96, and is connected through a differentiating circuit constituted by a capacitor 97 and resistor 98 to a driver circuit which is constituted by resistors 99 and 101 and transistors 100, and is connected to the gate of thyristor 80 and gate switch 102.

In this circuit, when the power source voltage rises, voltage between the collector and emitter of transistor 103 becomes smaller. Impedance of the photo-coupler 88 therefore increases and oscillation frequency of the multivibrator is lowered, whereby input to magnetron 84 is regulated. Different output from magnetron 84 is obtained by changing the setting of variable resistor 89.

Needless to say, detection of power source variation may be effected by a tap on coil 12 and 14a in the circuit of FIG. 3, or various other methods for detection of power source signals may be employed without departure from the principles of the invention.

What is claimed is:
1. Magnetron power supply means for supplying converted AC power to a magnetron from a source of AC power comprising:
 a. rectifying means connected to said AC power source for rectifying said AC power to DC power;
 b. frequency converting means having at least one set made up of a resonant circuit and at least one thyristor switching circuit, and which frequency converting means is connected to said rectifying means;
 c. a step-up transformer having the primary side thereof connected to said resonant circuit;
 d. said magnetron being connected to the secondary side of said step-up transformer;
 e. an energizing transformer having the primary side connected to said AC power source and the secondary side connected to said magnetron for heating said magnetron;
 f. a power regulator including an adjustable reference circuit and coupled to said frequency converting means for controlling the power produced from said frequency converting means to a predetermined amount established by said adjustable reference circuit; and
 g. signal generating means coupled in said magnetron power supply means for generating a signal having a value proportional to the value of said converted AC power supplied to said magnetron, and having the output coupled to said power regulator for supplying said signal to said power regulator for controlling said power regulator for increasing the power produced from said frequency converting means when said signal is below the reference level determined by said adjustable reference circuit and decreases said power when said signal is above said reference level.

2. Magnetron power supply means for supplying converted AC power to a magnetron from a source of AC power comprising:
   a. rectifying means connected to said AC power source for rectifying said AC power to DC power;
   b. frequency converting means having at least one set made up of a resonant circuit and at least one thyristor switching circuit, and which frequency converting means is connected to said rectifying means;
   c. a step-up transformer having the primary side thereof connected to said resonant circuit;
   d. said magnetron being connected to the secondary side of said step-up transformer;
   e. an energizing transformer having the primary side connected to said AC power source and the secondary side connected to said magnetron for heating said magnetron;
   f. trigger circuit means including an adjustable reference circuit and coupled to said thyristor switching circuit for applying a pulsating signal therefrom to said thyristor switching circuit, said thyristor switching circuit being alternately switched on and off in response to the presence and absence, respectively, of said pulsating signal applied thereto, thereby causing said primary side of said step-up transformer to generate an alternating current at a predetermined power proportional to the power of said pulsating signal supplied from said adjustable reference circuit, said converted AC power being generated from said secondary side of said step-up transformer at a level proportional to said predetermined power upon flow of said alternating current through said primary side of said step-up transformer; and
   g. signal generating means for generating a control signal having a value proportional to the value of said converted AC power supplied to said magnetron, said signal generating means being coupled to said trigger circuit means to supply said control signal thereto for regulating the power of said pulsating signal for decreasing the power of said pulsating signal when said control signal becomes larger than a predetermined value determined by said adjustable reference circuit, and increasing said power when said control signal becomes smaller than said predetermined value, thereby stabilizing the input power to the magnetron.

3. Magnetron power supply means as claimed in claim 2, wherein said frequency converting means comprises a resonant circuit having a parallel connected coil and capacitor.

4. Magnetron power supply means as claimed in claim 2 further comprising a reset circuit coupled to said resonant circuit and including a parallel connected coil and capacitor.

5. Magnetron power supply means as claimed in claim 2, wherein said trigger circuit means comprises means for controlling the power of said pulsating signal by the frequency of the pulsating current.

6. Magnetron power supply means as claimed in claim 2, wherein said trigger circuit means comprises means for controlling the power of said pulsating signal by the duty cycle of the pulsating current.

7. Magnetron power supply means as claimed in claim 2, wherein said signal generating means comprises a bridge circuit having a transistor therein for producing a signal corresponding to power input applied to said magnetron.

8. Magnetron power supply means as claimed in claim 2, wherein said signal generating means comprises photocoupler connected to said secondary side of said step-up transformer connected to said secondary side of said step-up transformer for producing a signal corresponding to the power input to said magnetron.

9. Magnetron power supply means as claimed in claim 2, wherein said energizing transformer and said step-up transformer have independent cores.

* * * * *